United States Patent Office

3,222,393
Patented Dec. 7, 1965

---

3,222,393
1,2,3,4-TETRAALKYL BENZENE SULFONIC ACID PRODUCTION
Charanjit Rai, Crystal Lake, Ill., assignor, by mesne assignments, to Union Oil Company of California, Los Angeles, Calif., a corporation of California
No Drawing. Filed May 7, 1962, Ser. No. 192,976
6 Claims. (Cl. 260—505)

This invention relates to new and useful improvement in processes for the preparation of 1,2,3,4-tetraalkyl benzene sulfonic acids by a process analogous to the Jacobsen rearrangement.

Prehnitene sulfonic acid (1,2,3,4-tetramethyl benzene sulfonic acid) is well known in the chemical literature as a chemical intermediate. Prehnitene sulfonic acid is commonly made by sulfonation of durene with fuming sulfuric acid followed by heating the resulting durene sulfonic acid in concentrated sulfuric acid to cause the same to isomerize or rearrange to form prehnitene sulfonic acid. This isomerization or molecular rearrangement is known in the art as the Jacobsen reaction. The precise nature of the migration of methyl groups which takes place in the Jacobsen reaction is not known and the movement of radicals may be intra-molecular or inter-molecular or both. In the Jacobsen rearrangement (when carried out in sulfuric acid) there are numerous side reactions which can occur which decrease the yield of prehnitene sulfonic acid. These side reactions include disproportionation reactions in which pentamethyl benzene sulfonic acid and pseudocumene sulfonic acid are formed as well as mellitene and other polymethyl benzenes produced by removal of the sulfonic acid group.

It is therefore one object of this invention to provide a new and improved process for the preparation of 1,2,3,4-tetraalkyl benzene sulfonic acids by isomerization or rearrangement of the corresponding 1,2,4,5 or 1,2,3,5-tetraalkyl benzene sulfonic acids, in which side reactions are suppressed and substantially eliminated.

Another object of this invention is to provide a new and improved variation of the Jacobsen rearrangement in which a 1,2,4,5-tetraalkyl benzene sulfonic acid, such as durene sulfonic acid, or a 1,2,3,5-tetraalkyl benzene sulfonic acid is converted to a 1,2,3,4-tetraalkyl benzene sulfonic acid, such as prehnitene sulfonic acid, by heating in admixture with a polyphosphoric acid catalyst.

A feature of this invention is the provision of an improved process in which a 1,2,4,5 or 1,2,3,5-tetraalkyl benzene sulfonic acid is heated in admixture with polyphosphoric acid to a temperature of about 75°–150° C. to yield the corresponding 1,2,3,4-tetraalkyl benzene sulfonic acid in high yields with a minimum of undesired side reactions.

Other objects and features of this invention will become apparent from time to time throughout the specification and claims as hereinafter related.

This invention is based on my discovery that the Jacobsen rearrangement of 1,2,4,5 or 1,2,3,5-tetraalkyl benzene sulfonic acids is improved by the use of polyphosphoric acid as the isomerization or rearrangement catalyst. In accordance with my invention, a 1,2,3,4-tetraalkyl benzene sulfonic acid is prepared by heating a 1,2,4,5 or 1,2,3,5-tetraalkyl benzene sufonic acid in admixture with polyphosphoric acid to a temperature of about 75°–150° C. until reaction is substantially complete.

The polyphosphoric acid which is used as a catalyst in this reaction is a commercial product well known in the art. Commercial polyphosphoric acid consists of a liquid mixture of polymeric phosphoric acids having a $P_2O_5$ content in the range from about 72 to 90%, preferably about 82–84%. The material known as polyphosphoric acid is a mixture of polymeric phosphoric acids including triphosphoric acid, tetraphosphoric acid, pentaphosphoric acid, hexaphosphoric acid, and higher polyphosphoric acids in the form of a syrupy liquid. Since the material is a complex mixture of polyphosphoric acids, its exact composition cannot be determined and it is usually characterized by the $P_2O_5$ content of the mixture.

In carrying out the process of this invention, any tetraalkyl benzene sulfonic acid can be used which is of the type known to undergo the Jacobsen rearrangement.

In general, any 1,2,4,5 or 1,2,3,5-tetramethyl or tetraethyl benzene sulfonic acid will undergo the Jacobsen rearrangement when heated with sulfuric acid; these compounds undergo this rearrangement more readily and with less undesired side reactions when heated in admixture with polyphosphoric acid. While the invention is best described with reference to the Jacobsen rearrangement of durene sulfonic acid, it should be understood that any 1,2,4,5 or 1,2,3,5-tetramethyl or tetraethyl benzene sulfonic acid can be used in the process. While the reaction occurs most readily with symmetrical compounds, it should also be noted that unsymmetrical 1,2,4,5 or 1,2,3,5-tetraalkyl benzene sulfonic acids (which contain alkyl radicals of different size) which will undergo the Jacobsen rearrangement in accordance with this invention include, but are not limited to the following: durene sulfonic acid; 1,2,3,5-tetramethyl benzene sulfonic acid; 1,2,4,5 or 1,2,3,5-tetraethyl benzene sulfonic acid; 1,2-dimethyl-4,5, diethyl benzene sulfonic acid; 1,2-dimethyl-3,5-diethyl benzene sulfonic acid; 1-ethyl-2,4,5-trimethyl benzene sulfonic acid; and 1-methyl-2,4,5 triethyl-benzene sulfonic acid.

The following non-limiting examples are illustrative of the scope of this invention.

*Example I*

A mixture of 50 g. durene (1,2,4,5 tetramethyl benzene), 67 cc. of concentrated sulfuric acid and 33 cc. of 60% fuming sulfuric acid was stirred in a three-necked flask for 5–10 minutes. The lumps of durene were broken with a glass rod to facilitate reaction. The reaction mixture was poured over ice (250 g.) and vigorously stirred, the liquid was filtered at once, and the cold filtrate was treated with concentrated sulfuric acid, whereupon white crystals appeared. The crystals were filtered off and recovered as durene sulfonic acid (M.P. 115°–116° C.) in a yield of 90%.

Durene sulfonic acid, 10 g., was heated at about 100–125° C. with polyphosphoric acid (82–84% $P_2O_5$ content, 25 g., for 2 to 3 hours in a three-necked flask. The product was then poured over ice and filtered. The product which was obtained was found to be prehnitene sulfonic acid (M.P. 100–103° C.) in a yield of 85% (8.5 g.).

In carrying out this reaction, other tetramethyl or tetraethyl benzene sulfonic acids may be substituted for durene sulfonic acid, and undergo the Jacobsen rearrangement in higher yields than are obtained using the sulfuric acid catalyst of the prior art. While it is preferred to carry out this reaction at a temperature of about 100–125° C., the reaction is generally operative in the temperature range from about 75° to 150° C.

*Example II*

A mixture of 25.0 g. of 1,2,4,5-tetraethyl benzene, 100 cc. of concentrated sulfuric acid, and 20 cc. of 60% fuming sulfuric acid is stirred in a three-necked flask for 15 minutes. The reaction mixture is poured over ice, stirred vigorously, and filtered. The cold filtrate is then treated with concentrated sulfuric acid to precipitate 1,2,4,5-tetraethyl benzene sulfonic acid. It is recrystallized from benzene-petroleum ether mixture, and has a melting point of 119–120° C. The yield is 35 g. (92%). The product acid is then heated in admixture with polyphosphoric acid for 1 to 2 hours at about 125° C. At the end of this reaction time, the product is poured over ice and separated. The product which is obtained consists of 1,2,3,4-tetraethyl benzene sulfonic acid, and has a melting point of 117°–119° C. after recrystallization from benzene-petroleum ether mixture.

*Example III*

A mixture of 25.0 g. of 1,2,3,5-tetraethyl benzene, 100 cc. of concentrated sulfuric acid, and 20 cc. of 60% fuming sulfuric acid is stirred in a three-necked flask for 15 minutes. The reaction mixture is poured over ice, stirred vigorously, and filtered. The cold filtrate is then treated with concentrated sulfuric acid to precipitate 1,2,3,5-tetraethyl benzene sulfonic acid. The product acid is then heated in admixture with polyphosphoric acid for 1 to 2 hours at about 125° C. At the end of this reaction time, the product is poured over ice and filtered. The product which is obtained consists of 1,2,3,4-tetraethyl benzene sulfonic acid.

While I have described my invention fully and completely with emphasis upon certain preferred embodiments thereof, I wish it to be understood that within the scope of the appended claims this invention may be practiced otherwise than as specifically described.

The embodiments of the invention in which an exclusive property or privilege is claimed are defined as follows:

1. A method of preparing a compound of the formula:

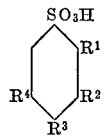

where $R^1$, $R^2$, $R^3$ and $R^4$ are selected from the group consisting of methyl and ethyl, which comprises heating a compound selected from the group consisting of:

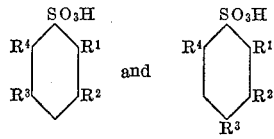

where $R^1$, $R^2$, $R^3$, and $R^4$ are as above-defined, in admixture with polyphosphoric acid to a temperature of about 75°–150° C. wherein said polyphosphoric acid has a $P_2O_5$ content of 72–90% and is present in an amount sufficient to catalyze isomerization.

2. A method in accordance with claim 1 in which $R^1$, $R^2$, $R^3$, and $R^4$ are methyl.

3. A method in accordance with claim 1 in which $R^1$, $R^2$, $R^3$, and $R^4$ are ethyl.

4. A method in accordance with claim 1 in which 1 to 3 of the R groups is methyl and the remaining R groups are ethyl.

5. A method in accordance with claim 3 in which the reaction temperature is 100°–125° C. and the product is recovered by filtration.

6. A method of preparing prehnitene sulfonic acid without substantial side reactions which consists of heating durene sulfonic acid to about 100°–125° C. in admixture with polyphosphoric acid and recovering the prehnitene sulfonic acid which is formed wherein said polyphosphoric acid has a $P_2O_5$ content of 72–90% and is present in an amount sufficient to catalyze isomerization of said durene sulfonic acid.

References Cited by the Examiner

Smith: J. Am. Chem. Soc., vol. 54, 1932, pp. 1614–1621.
Smith: the Jacobsen Reaction, Organic Reactions, vol. 1, 1942, pp. 370–375.
Smith: J. Am. Chem. Soc., vol. 58, 1936, p. 3.
Smith: J. Am. Chem. Soc., vol. 62, 1940, pp. 2631–2634.
Moyle et al.: J. Org. Chem., vol. 2, 1937, pp. 116–118, 132.
Van Wazer: Phosphorus and Its Compounds, vol. I, 1958, pp. 747–749, 770–772.
Webster's Third New International Dictionary, unabridged, 1961, p. 1760.

LORRAINE A. WEINBERGER, *Primary Examiner.*

LEON ZITVER, *Examiner.*